UNITED STATES PATENT OFFICE.

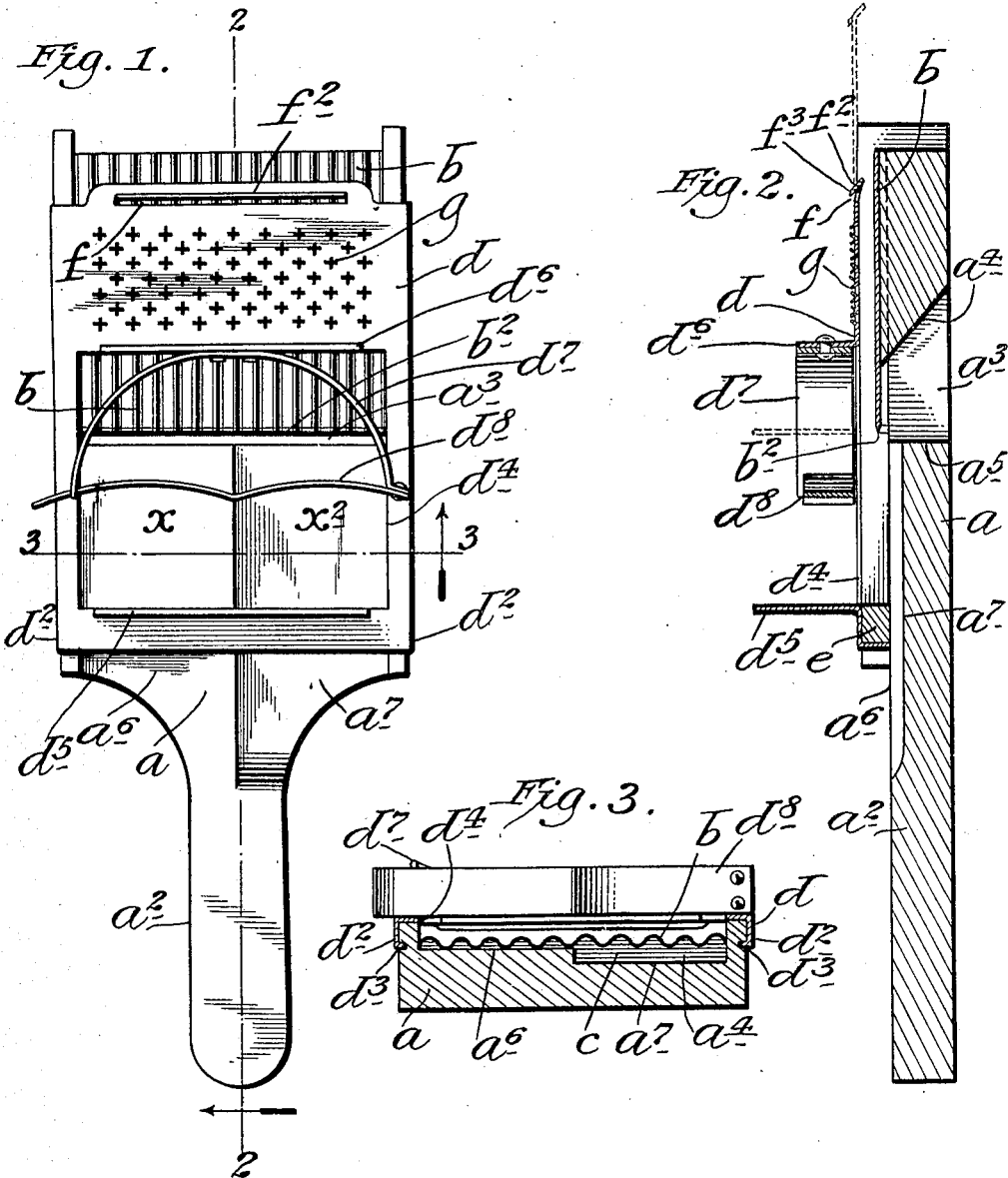

SAMUEL GORELICK, OF ELIZABETH, NEW JERSEY.

VEGETABLE-CUTTER.

No. 920,130.      Specification of Letters Patent.      Patented May 4, 1909.

Application filed April 30, 1908. Serial No. 430,099.

*To all whom it may concern:*

Be it known that I, SAMUEL GORELICK, a citizen of the United States, and residing at Elizabeth, in the county of Union and State of New Jersey, have invented certain new and useful Improvements in Vegetable-Cutters, of which the following is a specification, such as will enable those skilled in the art to which it appertains to make and use the same.

This invention relates to vegetable cutting devices, and the object thereof is to provide an improved device of this class by means of which apples, potatoes and similar fruits may be cut or sliced into different forms in the operation of preparing fruit products therefrom.

The invention is fully disclosed in the following specification, of which the accompanying drawing forms a part, in which the separate parts of my improvement are designated by suitable reference characters in each of the views, and in which:—

Figure 1 is a plan view of my improved vegetable cutter, Fig. 2 a longitudinal section on the line 2—2 of Fig. 1, and:—Fig. 3 a cross section on the line 3—3 of Fig. 1.

In the practice of my invention, I provide a board $a$ having a handle $a^2$ at one end thereof, and the board $a$ is provided centrally with a transverse opening $a^3$, the rear wall of which is preferably inclined downwardly and backwardly as shown at $a^4$, while the front wall thereof is vertical or at right angles to the bottom surfaces of the board as at $a^5$ in the form of construction shown.

Secured at the top of the end portion of the board opposite the handle $a^2$ is a longitudinally corrugated plate $b$, the front edge of which extends over the opening $a^3$ and is provided with a cutting edge $b^2$. The top surface of the board $a$ forwardly of the opening $a^3$ is divided into two longitudinal parts $a^6$ and $a^7$, one of which, the part $a^7$, as shown in the drawing is lower than the other and the cutting edge $b^2$ of the plate $b$ extends, in the form of construction shown, nearly to the plane of the wall $a^5$ of the opening $a^3$, and the top surface of the part $a^6$ of the board $a$ is flush with the bottoms of the corrugations of the plate $b$, and the top surface of the part $a^7$ of the board is in a plane parallel with and below the bottoms of said corrugations so as to form an open space $c$ as shown in Fig. 3.

Mounted on the board $a$ is a slide $d$, consisting, in the form of construction shown, of a metal plate having overlapping side flanges $d^2$ provided with inwardly directed members $d^3$ adapted to fit in corresponding grooves in the opposite sides of the board $a$, and by means of which the slide $d$ is held in place.

Secured to the front end of the plate forming the slide $d$ is a transverse strip or bar $e$, one end portion of which is thicker than the other and movable on the countersunk surface $a^7$ of the board $a$, while the other end portion thereof fits on and is movable on the surface $a^6$. The plate forming the slide $d$ is also provided with a large rectangular front opening $d^4$ at the front end of which is a raised member $d^5$ which forms a handle for manipulating said slide, and at the rear edge of the opening $d^4$ is a raised member $d^6$ to which is secured a spring $d^7$ the ends of which are curved forwardly or in the direction of the handle $a^2$, and secured to the ends of said spring is a transverse plate or member $d^8$.

At the extreme rear edge portion of the plate forming the slide $d$ is a transverse slot $f$ in front of which is a narrow strip $f^2$, the front edge portion of which is raised as shown at $f^3$, and provided with a cutting edge, and that portion of the plate forming the slide $d$ between the slot $f^2$ and the large opening $d^2$ is formed into a grater as shown at $g$. The operation of this device will be readily understood from the foregoing description, when taken in connection with the accompanying drawing and the following statement thereof.

The separate parts of the device are shown in their normal position in Fig. 1, and in their normal position in full lines in Fig. 2, and in cutting an apple, potato or similar vegetable for culinary purposes the said apple, potato or similar vegetable is peeled and is held in the space between either end portion $x$ or $x^2$ of the spring or plate $d^8$, and the raised handle portion $d^5$ of the slide $d$, and said slide with the apple or potato held in position therein is moved back and forth. In this operation the apple or potato is also pressed on the plate or board $a$, and if held over the sunken portion $a^7$ of said plate or board the apple or potato will be cut into strips, the thickness of which will depend on the vertical depth of the space $c$, and said strips will be corrugated on the top surface, or on the top and bottom surfaces thereof as they are cut off by the cutting edge $b^2$ of the corrugated plate $b$.

If the apple or potato be held on the surface $a^6$ of the board $a$ it will be cut into narrow strips of different forms in cross section, according to the position in which said apple or potato is held on the board $a$. The spring $d^7$ permits the strip or plate $d^8$ to be moved back and forth or toward and from the raised handle member $d^5$, and by reason of this construction apples or potatoes of different sizes may be placed in position between the strip or board $d^7$ and the raised handle member $d^5$.

In the operation above described, the sheets or strips cut from the apple or potato fall through the opening $a^3$ and may be caught in any suitable receptacle prepared therefor, and in the operation of this device the rear end of the board $a$ may be held on a bucket or other receptacle, in the operation hereinbefore described and the material cut from the apple or potato will fall thereinto.

The rear end portion of the plate forming the slide $d$ is normally at a predetermined distance above the corrugated plate $b$, and the grater $g$ may be used in a manner similar to other devices of this class, as will be readily understood.

In addition to cutting the apple or potato into different strips or sheets as hereinbefore described, the slide $d$ may be moved backwardly into the position shown in dotted lines in Fig. 2, and by grasping the apple or potato in the right hand and holding the device by the handle $a^2$ the apple or potato may be moved downwardly over the cutting edge $f^3$, and in this manner thin narrow strips may be cut from said apple or potato, and these strips will fall through the transverse slot or opening $f$ and into any suitable receptacle over which the device may be held.

In addition to the use of the device as hereinbefore set out for cutting or slicing apples, potatoes or similar vegetables, this device may also be used for cutting balls of stiff dough into different forms, strips or slices, which may afterward be fried or baked in the usual manner.

It will be observed that the plate or board $a$ is provided at its opposite sides with raised longitudinal portions or members $a^3$ on which the slide plate $d$ is movable, and said slide plate is thus supported above the cutter plate $b$ and above the surfaces $a^6$ and $a^7$, and the thickness of the strips or slices of vegetables or other material cut as hereinbefore described from vegetables, dough and the like will depend on the distance between the cutting edge $b^2$ of the cutter plate $b$ and the top surfaces $a^6$ and $a^7$ of the plate or board $a$.

Having fully described my invention what I claim as new and desire to secure by Letters Patent, is;—

1. A device of the class described, comprising a main plate or board provided at one end with a handle and centrally thereof with a transverse opening, a cutter plate secured on the rear end of said main plate or board and provided with a cutting edge which extends forwardly over said opening, and a slide plate mounted on said main plate or board and provided in the end thereof adjacent to the handle with a large opening, the top surface of the main plate or board forwardly of the transverse opening therein being divided longitudinally into two parts one of which is lower than the other.

2. A device of the class described, comprising a main plate or board provided at one end with a handle and centrally thereof with a transverse opening, a longitudinally corrugated cutter plate secured on the rear end of said main plate or board and provided with a cutting edge which extends forwardly over said opening, and a slide plate mounted on said main plate or board and provided in the end thereof adjacent to the handle with a large opening, the top surface of the main plate or board forwardly of the transverse opening therein being divided longitudinally into two parts one of which is lower than the other, said slide plate being also provided in its rear edge portion with a transverse slot or opening rearwardly of which is a raised cutter, and that portion of the slide plate between said slot or opening and the opening in the front end portion thereof being formed into a grater.

3. A device of the class described, comprising a main plate or board provided at one end with a handle and centrally thereof with a transverse opening, a longitudinally corrugated cutter plate secured on the rear end portion of the plate or board and provided with a front cutting edge which extends over said opening, a slide plate mounted on the main plate or board and provided in its front end portion with a large opening, a spring secured at the rear edge of said opening and the ends of which extend forwardly, and a transverse strip or plate secured to the ends of said spring.

4. A device of the class described, comprising a main plate or board provided at one end with a handle and centrally thereof with a transverse opening, a cutter plate secured on the rear end portion of the plate or board, and provided with a front cutting edge which extends over said opening, said plate being corrugated longitudinally, a slide plate mounted on the main plate or board and provided in its front end portion with a large opening, a spring secured at the rear edge of said opening, and the ends of which extend forwardly, a transverse strip or plate secured to the ends of said spring, the top surface of the main plate or board forwardly of said opening being also divided longitudinally into two parts, one of which is lower than the other.

In testimony that I claim the foregoing as my invention I have signed my name in presence of the subscribing witnesses this 29th day of April 1908.

SAMUEL GORELICK.

Witnesses:
C. E. MULREANY,
M. E. DOODY.